United States Patent [19]

Barecki

[11] 3,747,979
[45] July 24, 1973

[54] CANTILEVERED SEAT FOR MOTORCOACH VEHICLES OR THE LIKE

[75] Inventor: Chester J. Barecki, Grand Rapids, Mich.

[73] Assignee: American Seating Company, Grand Rapids, Mich.

[22] Filed: Dec. 23, 1971

[21] Appl. No.: 211,423

[52] U.S. Cl.................. 297/451, 296/63, 297/445, 244/122 R
[51] Int. Cl............................ A47c 7/02, B60n 1/00
[58] Field of Search..................... 297/232, 243, 158, 297/445, 450, 451; 108/108, 152; 248/216, 235; 296/63, 64, 65 R; 244/122 R

[56] References Cited
UNITED STATES PATENTS

| | | | |
|---|---|---|---|
| 3,625,565 | 12/1971 | Barecki | 297/451 |
| 3,493,208 | 2/1970 | Sato | 248/235 |
| 1,677,764 | 7/1928 | Gloekler | 312/140 |
| 3,632,159 | 1/1972 | Barecki | 297/451 |

*Primary Examiner*—Casmir A. Nunberg
*Attorney*—James J. Hill

[57] ABSTRACT

A two-passenger seat is supported by a lower cantilever frame which comprises a horizontal seat frame and an inclined truss support frame. The horizontal seat frame includes two elongated horizontal stretcher tubes attached at one end to the wall of a vehicle and at least two cross frame members interconnecting the stretcher tubes at laterally spaced locations. The inclined truss support frame is located beneath the horizontal seat frame; and it includes fore and aft inclined frame members rigidly attached a their upper ends to the stretcher tubes respectively at locations on the aisle side of the transverse center of the horizontal seat frame. The inclined support frame members extend downwardly from the seat frame and they converge toward each other. They are connected to the wall at locations above the floor of the vehicle.

14 Claims, 13 Drawing Figures

Patented July 24, 1973

Patented July 24, 1973 3,747,979

Patented July 24, 1973

Patented July 24, 1973 3,747,979

CANTILEVERED SEAT FOR MOTORCOACH VEHICLES OR THE LIKE

BACKGROUND AND SUMMARY

The present invention relates to seating; and more particularly, it relates to structure for cantilevering a two-passenger seat from the side wall of a motorcoach or similar vehicle without a supporting connection to the floor. The term "motorcoach seating" is intended to include all types of transportation seating including city service, suburban, and reclining coach seats, characterized in that each seat is intended to hold two persons, one near the wall and one near the aisle of the vehicle.

It has become desirable from the viewpoint of maintenance, to provide seating of the cantilever type, supported entirely from the wall of the vehicle. This type of seat eliminates the usual obstructions connecting the seat to the floor, such as legs, pedestals, or aisle end bases which are usually found supporting the seat at or near the aisle end.

As mentioned, one of the primary advantages of a cantilever-type seat is the ease of cleaning the vehicle with a gang-type sweeper cleaning the entire width of the vehicle in a single sweep, thereby substantially reducing the time and cost of cleaning. There are, however, other advantages to cantilever seats, including a more pleasant and neater appearance, greater facility of ingress and egress by passengers in the seats, elimination of stumbling hazards that legs or bases may contribute to passengers walking down a narrow aisle or exiting from the seat, and ease of retrieving articles from beneath the seats. The latter advantage stems from the fact that an unobstructed view of the floor area is provided, and the available light shines on the unobstructed area. Further, depending upon the seat structure, there may be more room for storage of luggage, etc. beneath a cantilevered seat as well as an increased area for the legs of the passengers located behind the seat.

There are problems, however, in achieving a cantilever seat which has all of the advantages mentioned above yet which is sturdy over the extended period of rugged use expected of a motorcoach seat and which does not become hazardous in the event of a crash. Perhaps the more important of these two considerations is that of safety. In the event of a crash, the seat structure and its attachment to the vehicle wall must be such that the seat does not become detached from the wall either upon crash impact or upon being impacted by a passenger, for example, from the seat behind. If a seat does become detached from the wall, it adds additional energy and momentum to break loose adjacent seats which, in turn, if broken loose, still further increase the danger to passengers. Adjacent seats which are rigidly mounted so as to remain in place in the event of a crash become, in effect, safety barriers to define a critical zone or compartment in which a passenger is restrained from adding to crash momentum and, at the same time, which protects a passenger against the danger of flying objects.

The present invention achieves all of the advantages of a cantilever seat while achieving substantial crash integrity. That is, in the event of a crash, seats constructed according to the present invention are flexible enough not to impart a substantial amount of energy to an occupant in the case of a crash or to come detached if struck by a passenger, but they also act to provide a compartment to hold a passenger in a safety zone, protected against flying objects and against gathering impact momentum himself.

Seating constructed according to the present invention comprises a lower cantilever frame including a horizontal seat frame and an inclined truss support frame. The seat frame has two elongated stretcher members attached at one end to the wall of a vehicle and extending outwardly thereof. Preferably at least two cross frame members interconnect the stretcher members at laterally spaced locations. The truss frame is located beneath the seat frame and it acts as a truss not only to hold the seat frame in its horizontal position, but also to enhance its resistance to twisting relative to the wall in the event that it is struck by a loose object in a crash.

The truss frame includes fore and aft inclined frame members rigidly attached at their upper ends to the stretcher members respectively at locations toward the aisle side of the transverse center of the seat frame. The inclined truss frame members extend downwardly from the seat frame, and they converge toward each other. They are connected to the wall at spaced locations above the floor of the vehicle.

A stress analysis of a cantilever frame constructed according to the present invention indicates that it is a substantial improvement, from a safety standpoint, from certain two-passenger seats which have been suggested in the past. Bending in the horizontal seat frame members is minimized by attaching the upper ends of the diagonal support frame members toward the aisle end of the transverse center of the seat. Further, twisting about a vertical axis (that is, away from the wall) is minimized because of the trust effect produced by the inclined or diagonal support frame members. It has been found that each member of the structure contributes to bearing the load and resisting bending or twisting, thereby yielding a safer and more durable structure and providing one which has a high degree of crash integrity.

Other features and advantages of the present invention will be apparent to persons skilled in the art from the following detailed description of preferred embodiments accompanied by the attached drawing wherein identical reference numerals will refer to like parts in the various views.

THE DRAWING

DETAILED DESCRIPTION

Figure 1:
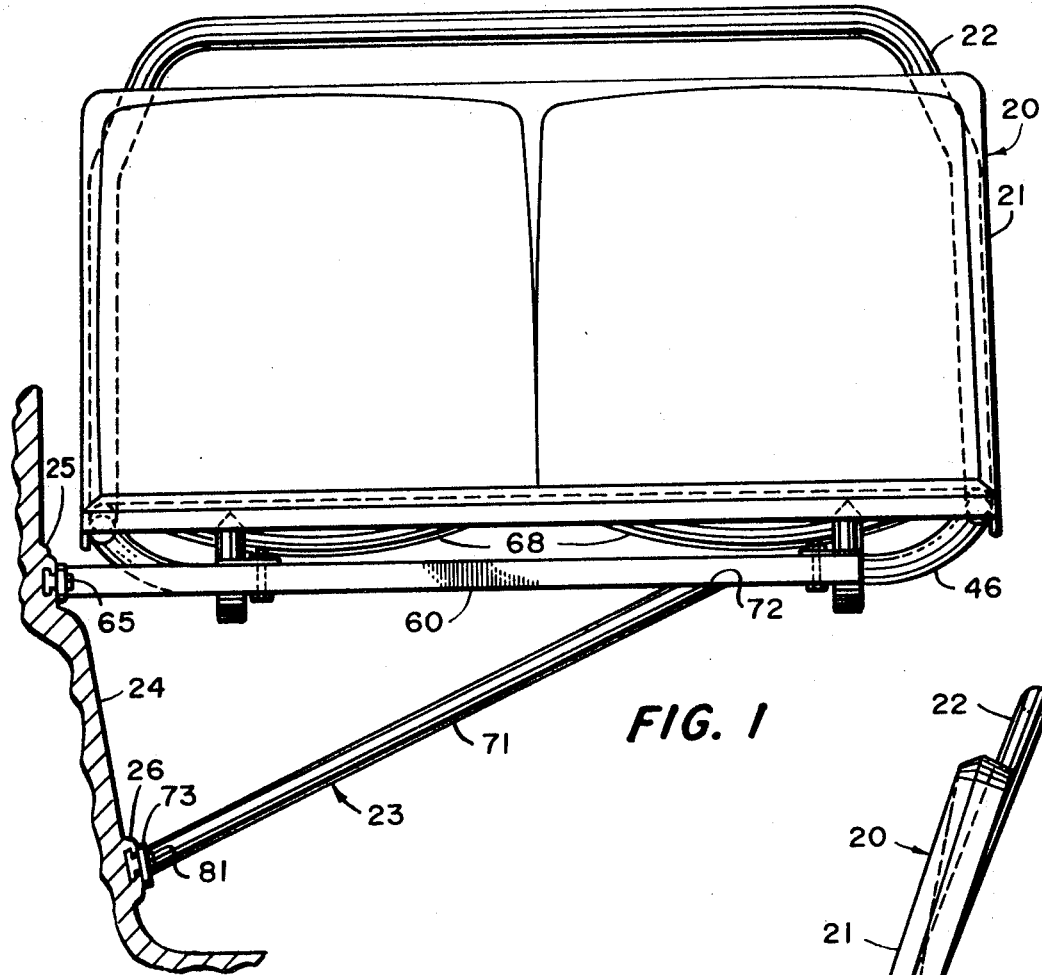
FIG. 1 is a front elevation view of a first type of two-passenger seat constructed according to the present invention and attached to a wall section shown in fragmentary form.

Before describing in detail the various embodiments and modifications illustrated in the drawing, it will be observed that the drawing shows four separate embodiments of a two-passenger seat that is cantilevered from a wall and has no direct connection to the floor. The first embodiment is shown in FIGS. 1-4 and it is distinguished from the other embodiments primarily in that the frame is adapted to receive a two-passenger seat unit, generally designated by reference numeral 20, which comprises a plastic shell 21 molded into a single piece.

The frame for the embodiment illustrated in FIG. 1 includes a separate upper tubular frame 22 (FIG. 3) to which the plastic shell 21 is secured, and a lower cantilever frame 23 (FIG. 4) to which the upper tubular frame 22 is secured. The cantilever frame 23 is also preferably tubular, and it is secured to an upright wall of a vehicle, as shown in fragmentary form and designated 24 in FIG. 1. The attaching means includes an upper track 25 and a lower track 26 for fore and aft adjustment of the seat. Other mounting means may be used to secure all of the embodiments of seats disclosed herein to the wall of a motor coach. It will be observed that the aisle side of each seat is free of attachment and that there is no attachment to the floor of the vehicle beneath the seat. That is, the sole means of supporting the seat is through attachment to the wall 24.

Figure 5:
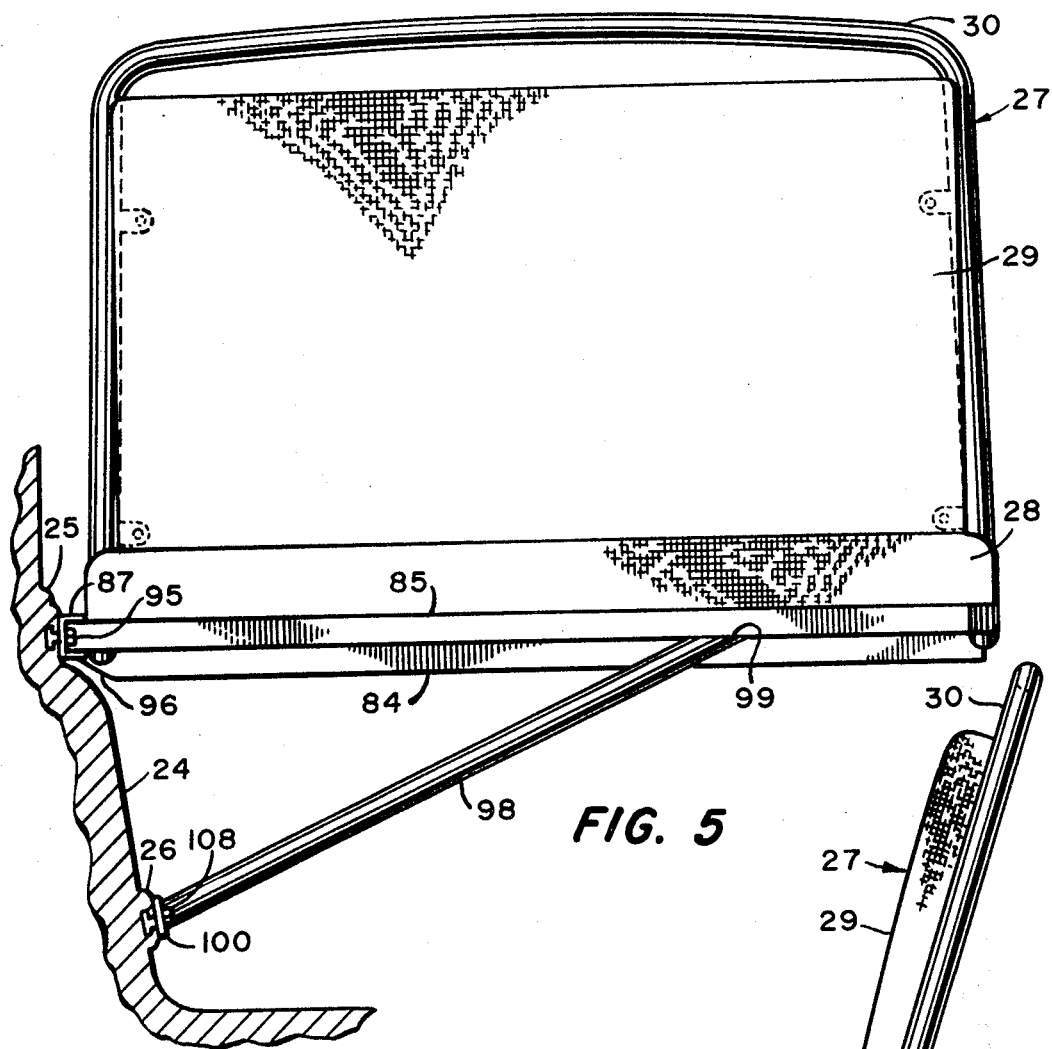
FIG. 5 is a front elevation view of a second type of two-passenger seat constructed according to the invention and attached to a wall shown in fragmentary form.
Figure 6:
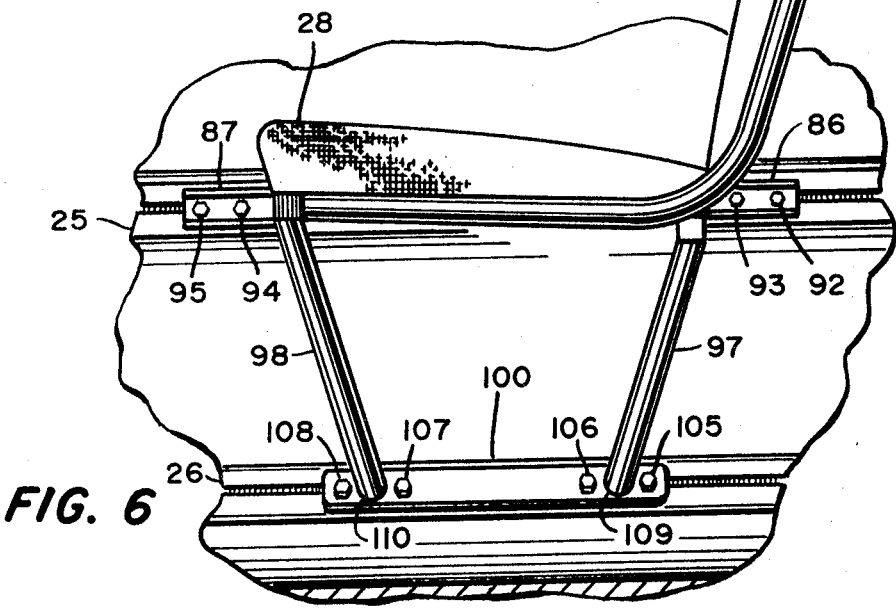
FIG. 6 is a side elevation view of the seat of FIG. 5.
Figure 7:
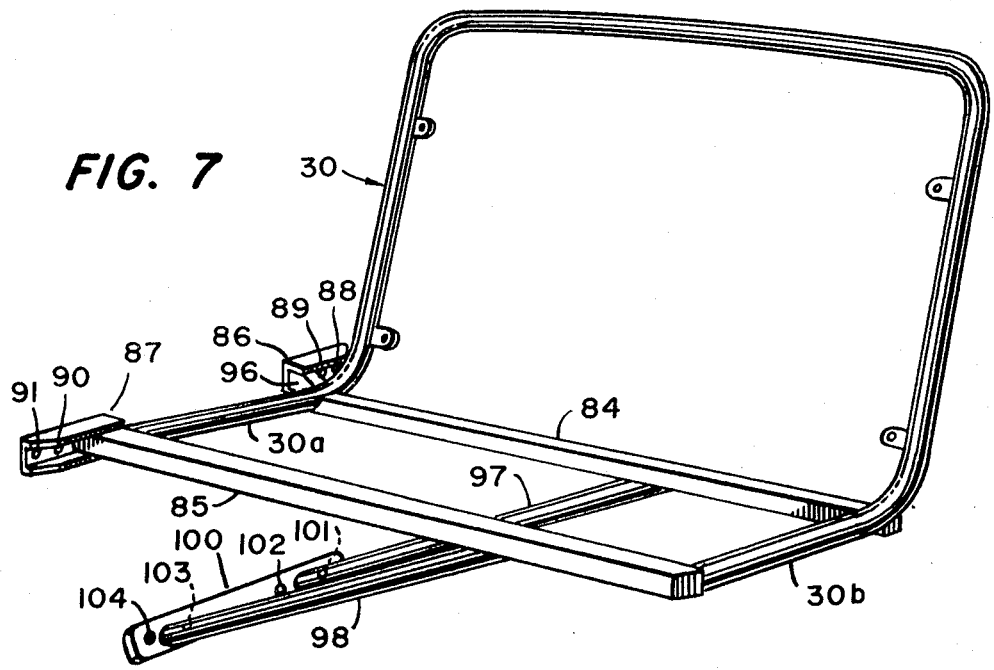
FIG. 7 is an upper perspective view of the frame of the seat of FIG. 5.

A second embodiment is shown in FIGS. 5-7, and it is characterized by an upholstered seat generally designated 27 including a single seat cushion 28 and a single back cushion 29. Both the seat cushion 28 and the back cushion 29 are secured to an integral tubular cantilever frame generally designated 30 in this embodiment. The cantilever frame 30 is attached to a wall, again designated 24 by means of an upper track 25 and a lower track 26, similar to the arrangement illustrated in the first embodiment.

Figure 8:
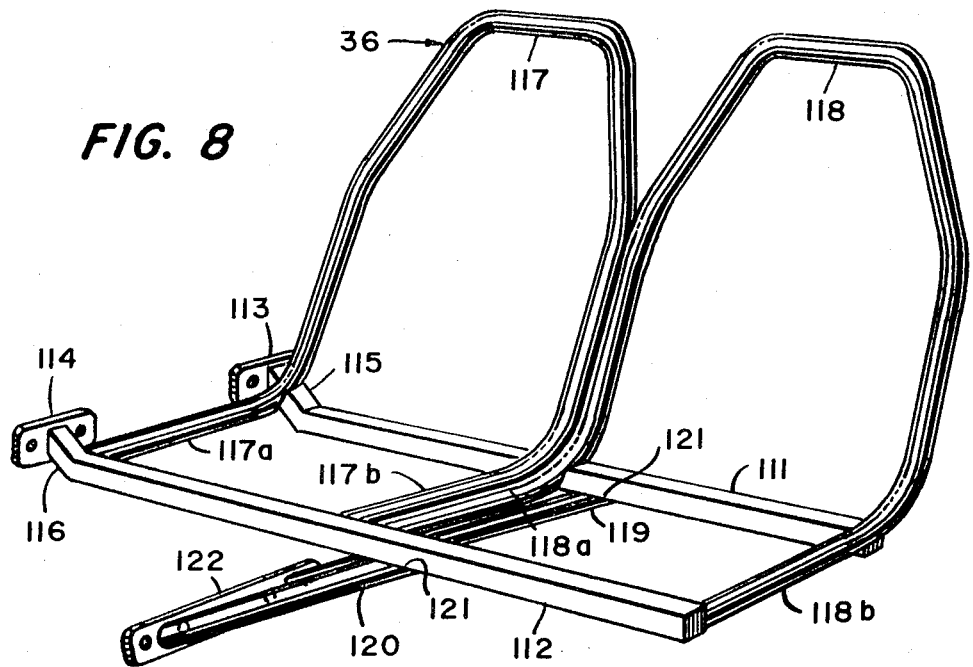
FIG. 8 is an upper perspective view of a frame for a third embodiment of a seat incorporating the present invention.
Figure 9:
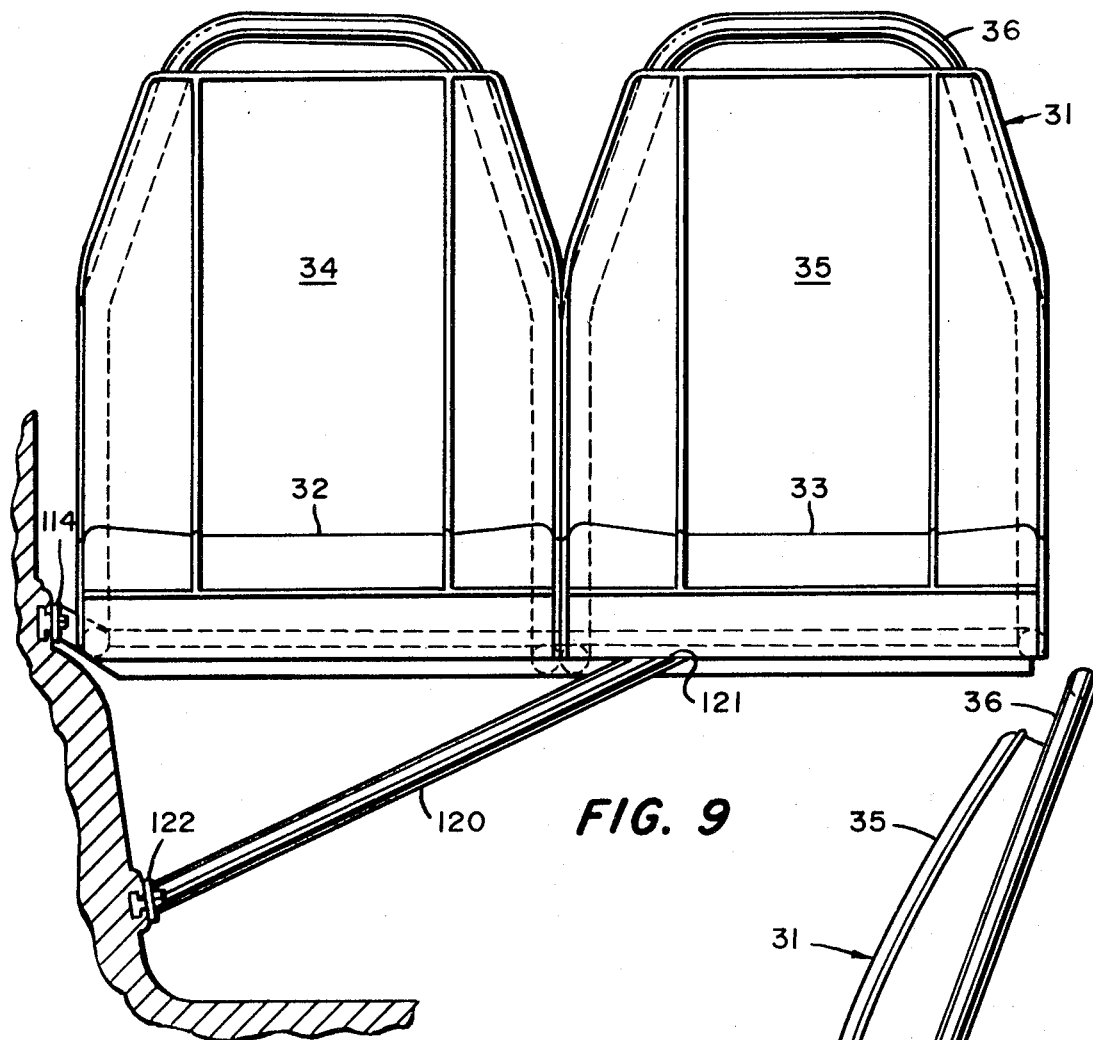
FIG. 9 is a front elevation view of the seat of FIG. 8.
Figure 10:
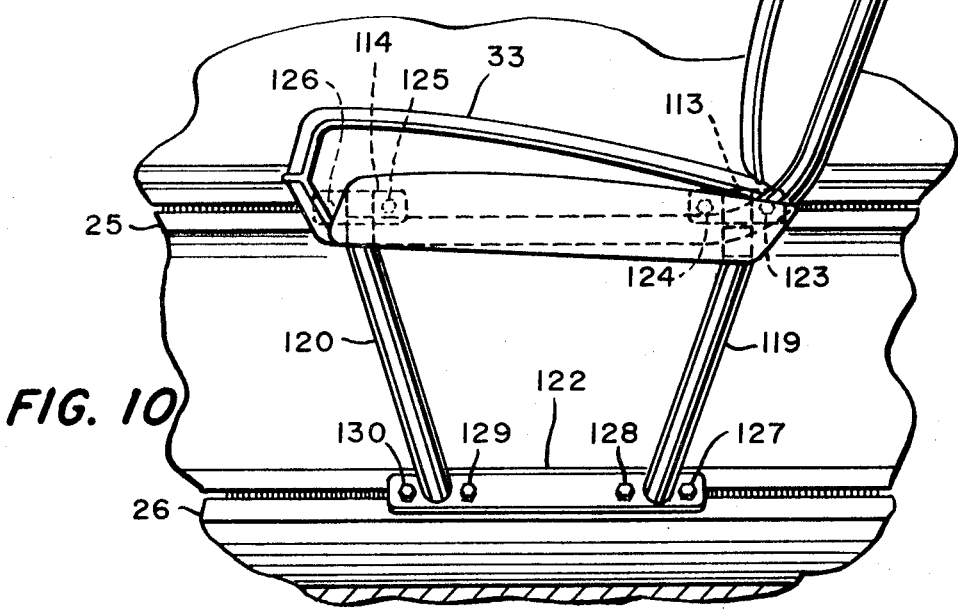
FIG. 10 is a side view of the seat of FIG. 8.

The third embodiment is shown in FIGS. 8-10, and it includes a two-passenger upholstered seat generally designated 31 which includes separate seat cushions 32 and 33, together with separate back cushions 34 and 35. The seat and back cushions are supported again by an integral tubular cantilever frame generally designated 36 which may be secured to a wall of a vehicle, again designated 25, in a manner similar to that shown in FIG. 1.

The fourth embodiment includes a two-passenger upholstered seat 37 with individual seat cushions 38 and 39 and individual backs 40 and 41 which may be reclined independently of each other, a tilted back being shown in phantom at 42. In this embodiment, the seats are mounted on a single, integral lower frame 43 which is attached to a wall 25 in a manner similar to that illustrated in connection with the embodiment of FIG. 1.

Figures 11, 12:
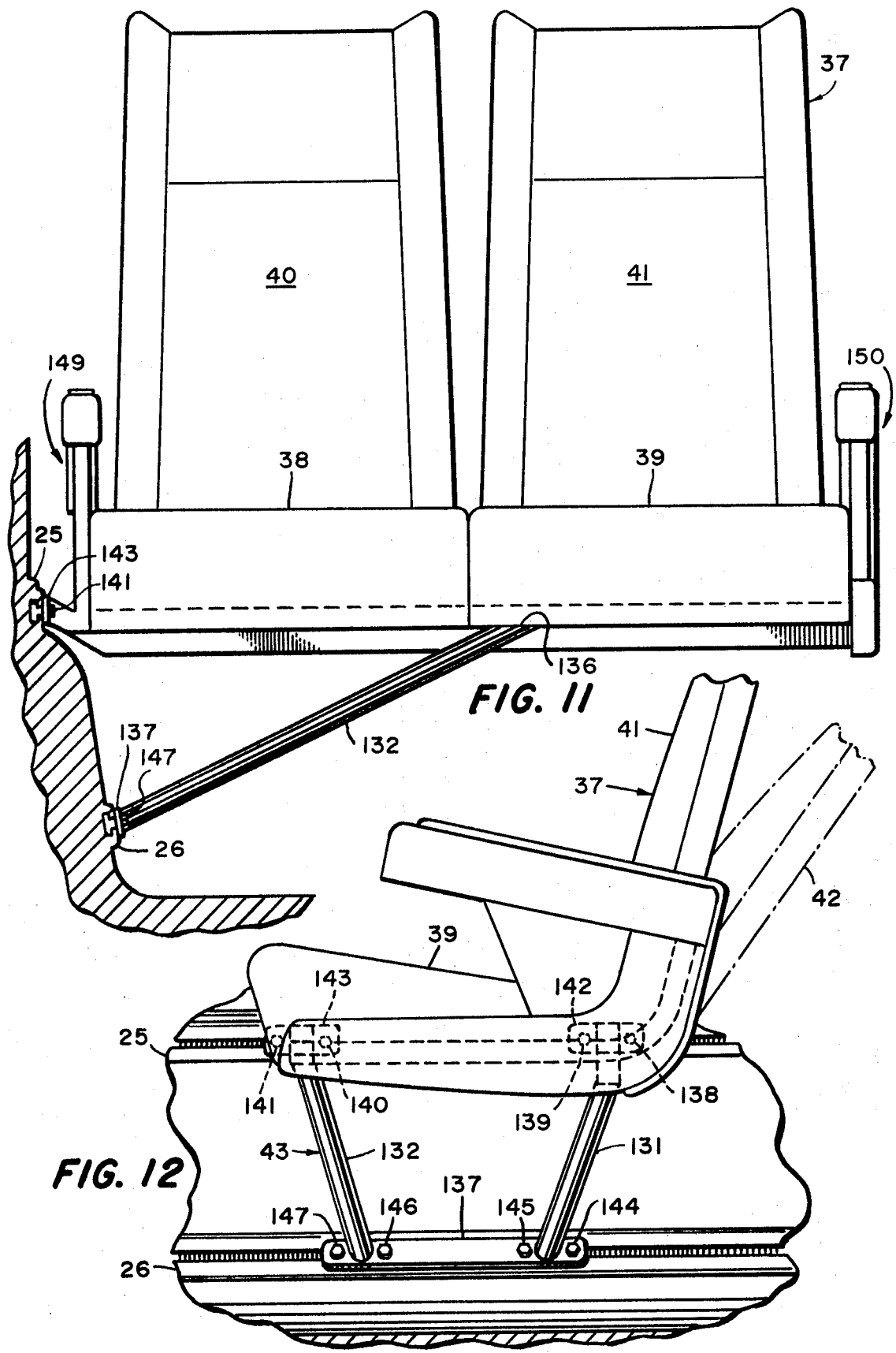
FIG. 11 is a front elevation view of a fourth embodiment of a seat constructed according to the present invention.
FIG. 12 is a fragmentary elevation view of the side of FIG. 11, taken from the aisle and showing a back reclined in broken line.
Figure 13:
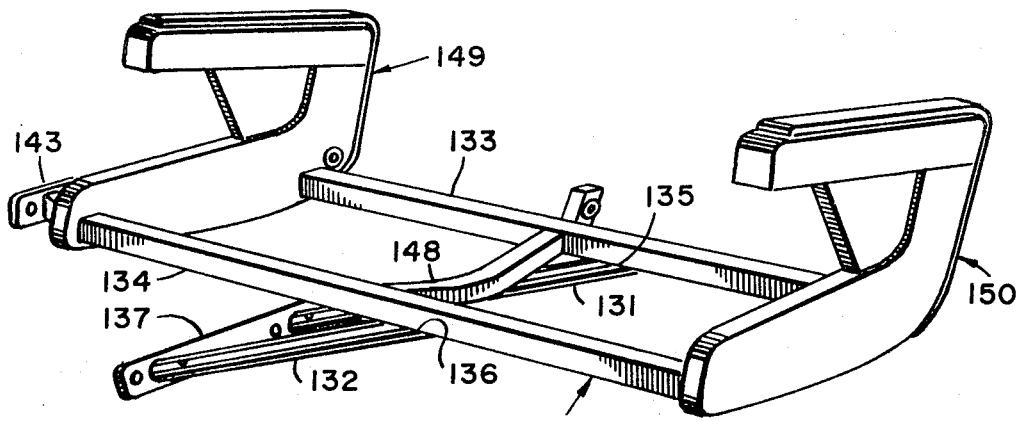
FIG. 13 is a perspective view of the support frame for the seat of FIG. 11.

In the various embodiments that will be described in detail presently, it will be observed that the cantilever frame includes a horizontal seat and an inclined truss support frame. The horizontal seat frame includes horizontal stretcher members extending lengthwise of the two-passenger seat and connected at one end to the wall as well as cross-frame members—preferably at least two. The inclined truss frame has two inclined tubular frame members connected at their upper ends to the two horizontal stretcher members of the seat frame and converging toward each other when proceeding toward the wall where the lower end of each is connected. The horizontal seat frame may be adapted either to be connected to an upper seat frame (the embodiment of FIGS. 1-4), or to be integrated with an upper seat frame (the embodiments of FIGS. 5-10), or to receive the seats directly (the embodiment of FIGS. 11-13). In all cases, the cantilever frame is provided with sufficient structural integrity to sustain specified stress requirements for durability and safety.

Figure 3:
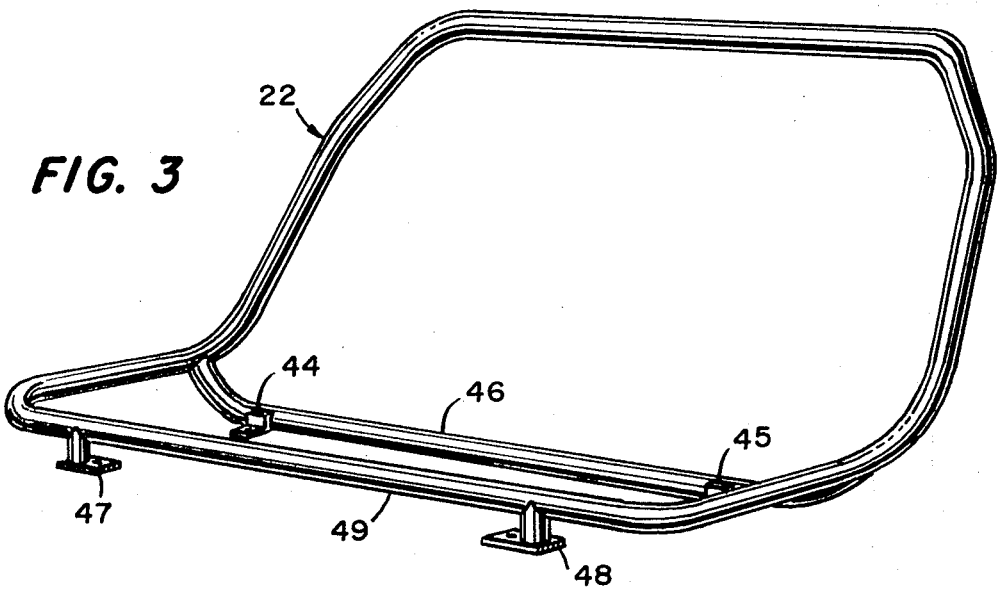
FIG. 3 is a perspective view of the upper frame of the seat of FIG. 1.
Figure 4:
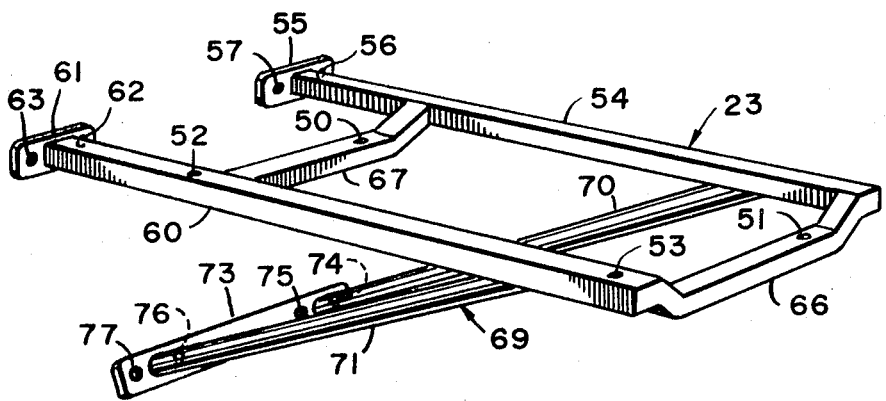
FIG. 4 is a perspective view of the cantilever frame of the seat of FIG. 1 illustrating the locations of attachment of the upper frame as well as the wall connections.

Turning now to the first embodiment, and particularly to FIGS. 3 and 4, the upper frame 22 includes two connecting brackets 44, 45 which are welded or otherwise attached to a rear stretcher tube 46. Two similar connecting brackets 47, 48 are welded to a front stretcher tube 49. The brackets 44, 45, 47 and 48 serve to connect the upper frame 22 to the cantilever frame 23 at clearance apertures 50-53 formed in stretcher tubes 54 and 60 which are placed to register with corresponding holes in the brackets 44-48.

The centilever frame 23 (FIG. 4) is preferably constructed of tubing that has a square cross section because of its additional strength for the same nominal dimension. However, round tubing of greater section modulus could equally well be used. The cantilever frame 23 includes a rear horizontal stretcher tube 54 with an attachment bracket 55 at its wall end having two bolt holes 56 and 57 for bolts 58 and 59 (best seen in FIG. 2) which are inserted into tee nuts slidably received in the upper attachment track 25 on the wall 24. Front stretcher tube 60 is similarly provided with an end bracket 61 with bolt holes 62 and 63. Two bolts are used, one on each side of the front and rear stretcher tubes to minimize bending in the wall brackets. However, a bracket with two bolts holes ahead of the front stretcher and two behind the rear stretcher tube can be used if the bracket is strengthened by heavier gauge or flanged. This would provide easier access to the mounting bolts (see FIG. 6).

An aisle-side cross frame member 66 and a wall-side cross frame member 67 are connected between the horizontal stretcher tubes 54 and 60 and they are centrally depressed toward the rear to allow room for the rear stretcher tube 46 of the upper frame which is lower than the front stretcher 49 due to the bucket effect 68 of the plastic shell 21.

Figure 2:
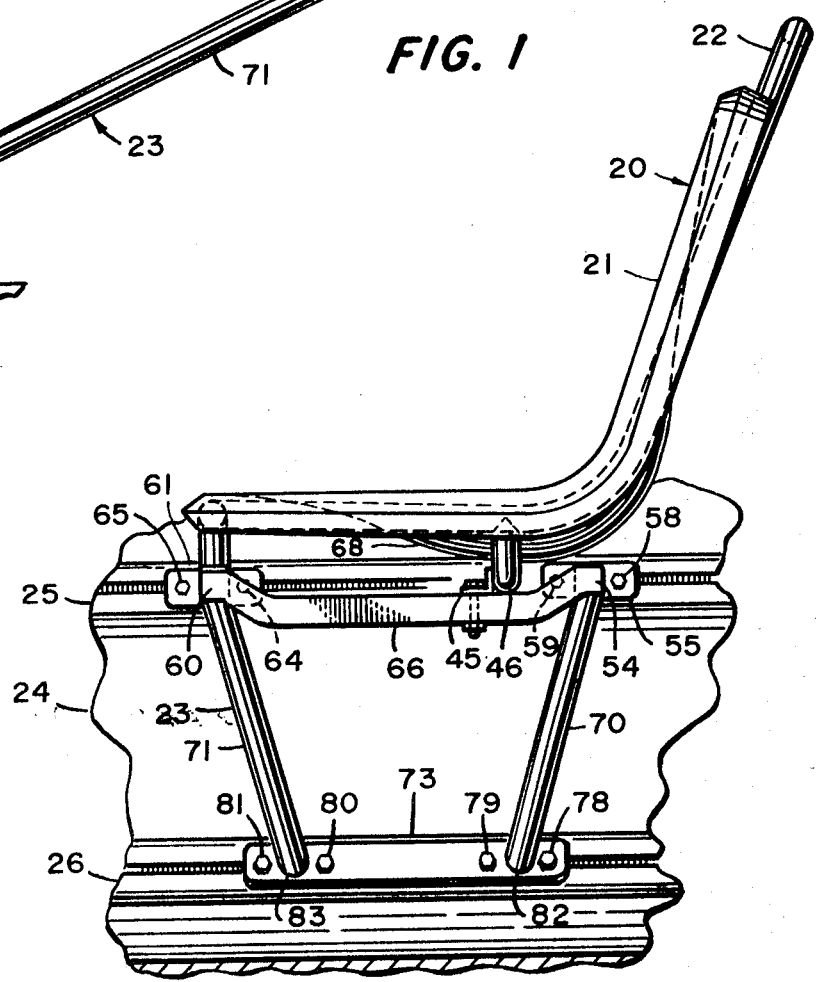
FIG. 2 is a side elevation view of the seat shown in FIG. 1, taken from the aisle.

An inclined truss frame generally designated 69 includes two heavy gauge round tubes 70 and 71 welded to the underside of front and rear horizontal square stretcher tubes 54 and 60 near the aisle end of the lower frame as at 72 (FIG. 1), and they extend downwardly and to the wall 24 where the lower ends are connected to an elongated bar 73. The bar 73 has bolt holes 74-77, one being on each side of each of the inclined tubes 70 and 71. Bolts 78, 79, 80, 81 attach the bar 73 to the lower wall track 26. As is best seen in FIG. 2, the inclined tubes converge at their lower ends 82 and 83 to allow a maximum of leg and foot room for the passengers sitting in the illustrated seat as well as in the seat behind it. The bar 73 can alternatively be made as two pads at the end of each inclined tube if weight is a factor.

In the second embodiment (FIGS. 5–7) the cantilever frame is shown separately in FIG. 7. The cantilever frame includes a single tube 30 formed with a back support and forwardly extending portions 30a and 30b which form the cross frame members for the horizontal frame. The entire frame is formed into a unitary structure with square stretcher tubes 84 and 85 integrating the back support with the horizontal frame. To facilitate attachment of the frame to the upper wall track 25 with standard power tools, short pieces of channel 86 and 87 are provided at the wall ends of stretcher tubes 84, 85; and pairs of bolt holes 88, 89 and 90, 91 are located in each channel to the outside of the stretcher tubes. Four bolts 92–95 (FIG. 6) attach the frame to the upper wall track 25. The rear stretcher tube 84 is lower than the front stretcher tube 85, so an inclined extension of tube 96 (FIG. 7) is connected between the rear stretcher 84 and the rear channel 86.

The truss frame includes inclined tubes 97 and 98 which are connected to the stretchers 84 and 85 near their upper, aisle ends as at 99 (FIG. 5) and at their lower extremities to a long bar 100 having four bolt holes 101–104 for associated bolts 105–108 (FIG. 6) for attachment to the lower wall track 26. The lower ends 109 and 110 of the inclined truss tubes 97 and 98 converge to allow greater foot room for the passengers sitting at the wall.

The previously-mentioned members 30a and 30b are welded to the horizontal stretcher tubes 84, 85 at laterally spaced locations next to the wall and aisle respectively to add rigidity to the seat frame.

Turning now to the embodiment of FIGS. 8–10, the seat cushions 32 and 33 are much thicker than those for the embodiment of FIGS. 5–8 to provide a softer, more comfortable ride. In order to maintain the same seat height, the lower portion of the frame 36 (FIG. 8) is lower than the lower portion of the frame 30 of FIG. 7, so provisions are made to connect horizontal stretcher tubes 111 and 112, FIG. 8, with separate wall brackets 113 and 114. This is done by the use of short pieces of inclined tubing 115 and 116. Another difference between this frame and the one just discussed is that this one has individual tube supports 117 and 118 to support the individual seat and back cushions 32, 33, 34, 35 of FIG. 9. The support 117 includes forwardly formed portions 117a and 117b welded to the inclined tubes 115 and 116 and to the horizontal stretcher tubes 111 and 112 respectively. Similarly, the tube 118 includes forwardly projecting portions 118a and 118b welded between the stretcher tubes 111 and 112. The members 117a, 117b, 118a and 118b form the cross frame members of the horizontal seat frame, and the inclined tubes 115, 116 are extensions of the horizontal stretcher tubes 111, 112.

Inclined truss tubes 119 and 120 are attached to the bottom of stretcher tubes 111 and 112 near the aisle end, at 121 (FIG. 9) and their lower ends are attached to the bar 122. In FIG. 10 all of the bolts are shown attaching the seat to the wall including bolts 123–126 which attach the upper brackets 113 and 114 to the upper wall track 25, and the bolts 127–130 which attach the bar 122 to the lower wall track 26.

A reclining seat 37 (FIGS. 11–13) is attached to the wall in a similar manner to that already described. The seats are wider, for a wider, more deluxe coach, and so the inclined truss tubes 131 and 132 extend upwardly from the lower wall track 26 at approximately the same angle as in the other seats, connecting to rear and front horizontal stretcher tubes 133 and 134 just on the aisle side of the transverse center of the frame, as shown at 135 and 136, FIGS. 11 and 13.

A bar 137 serves as a base to connect the lower ends of the diagonal tubes to the lower track 26. Upper attachment bolts 138–141 attach plates 142 and 143 to the upper track, FIG. 12, while bolts 144–147 attach the bar 137 to the lower rail 26. In this embodiment, a first cross frame member 148 interconnects the centers of the stretcher tubes 133, 134; and the bases of arm rest assemblies generally designated 149 and 150 provide cross frame members for interconnecting the stretcher tubes at their wall and aisle ends respectively.

Having thus described in detail various embodiments of the present invention, persons skilled in the art will be able to modify certain of the structure shown or substitute equivalent elements for those disclosed while continuing to practice the principal of the invention; and it is, therefore, intended that all such modifications and substitutions be covered as they are embraced within the spirit and scope of the appended claims.

I claim:

1. In a multi-passenger seat for a vehicle, the combination comprising: a horizontal seat frame having two elongated horizontal stretcher tubes and cross frame means interconnecting said stretcher tubes at laterally spaced locations to form a rigid structure; inclined truss frame located beneath said horizontal stretcher tubes and including forward and rear inclined frame members rigidly attached at their upper ends to said stretcher tubes respectively and inclined downwardly and converging toward each other from said attachments; and means for mounting the wall ends of said stretcher tubes and the lower ends of said inclined tube members to the wall of said vehicle at a location above the floor, said seat being characterized in there being no connection between said seat and the floor of the vehicle.

2. The combination of claim 1 wherein said mounting means includes first and second brackets connected respectively to the wall ends of said horizontal stretcher tubes and each including two bolt holes adapted to receive bolts and attaching said stretcher tubes to said wall.

3. The combination of claim 2 wherein the bolt holes of said end brackets of said stretcher tubes are located respectively forwardly and rearwardly of an associated stretcher tube to prevent twisting of said bracket relative to said wall.

4. The combination of claim 1 wherein said mounting means comprises an integral elongated bar interconnecting the lower, wall ends of said inclined truss frame members and providing bolt holes adapted to receive bolts for securing said elongated bar to the wall of said vehicle.

5. The combination of claim 1 wherein said cross frame means includes at least first and second tubular frame members interconnecting said stretcher tubes respectively at the aisle and rear ends thereof.

6. The system of claim 1 wherein said cross frame means comprises first and second tubular members interconnecting said stretcher tubes, at least one of said cross frame tube members being adjacent the aisle end of said seat, said seat further comprising an upper tubular frame adapted to be secured with bolts to at least one of said stretcher tubes and to said cross frame tubular members.

7. The system of claim 6 further comprising a single-piece seat shell defining a bucket contour, said cross frame members being depressed to accommodate said bucket shape.

8. The combination of claim 1 further comprising first and second channel members connected respectively to the wall ends of said horizontal stretcher tubes and extending respectively forwardly and rearwardly of the forward and rear stretcher tubes, each channel member including means providing apertures adapted to receive bolts and securing the respective channel members to a wall of said vehicle.

9. The combination of claim 1 wherein said cross frame means comprises an integral tube forming a back support for said seat and including forwardly projecting tubular portions interconnected between said horizontal stretcher tubes adjacent respectively the aisle and wall ends thereof.

10. The combination of claim 1 wherein said cross frame means comprises first and second individual tubular members each formed to provide a back cushion support and including forwardly projecting horizontal portions connected respectively to said rearward and forward stretcher tubes at laterally spaced locations.

11. The combination of claim 1 wherein said inclined truss frame members are connected to associated stretcher members at locations toward the aisle side of the transverse center thereof to enhance resistance of said seat frame to bending and to twisting about a vertical axis.

12. A cantilever frame for a vehicle comprising a horizontal seat frame including two elongated stretcher tubes and at least two cross frame tubular members interconnecting said stretcher tubes at locations adjacent the aisle and wall ends thereof to form a rigid structure; an inclined truss frame including first and second tubular truss members rigidly connected at their upper ends to said stretcher tubes of said horizontal frame at locations toward the aisle end of the transverse center thereof and being inclined downwardly and converging toward each other from their respective attachments to said horizontal stretcher tubes; and elongated, continuous horizontal bar integrally connected with the lower, wall ends of said truss frame members and providing bolt holes for securing the same to said wall; and first and second bracket means connected respectively to the wall ends of said stretcher tubes and providing bolt holes for securing the same to said wall.

13. A cantilever support for a passenger seat comprising: a horizontal seat frame having two horizontally elongated stretcher members located respectively forwardly and rearwardly of said seat; means for attaching the inboard ends of said stretcher members to a vertical wall of said vehicle; cross frame means interconnecting said stretcher members at a location spaced outwardly of said wall; inclined truss frame means located beneath said horizontal stretcher members and including forward and rear inclined frame members rigidly attached at their respective upper ends to said stretcher members respectively and extending downwardly therefrom to said wall; and second attaching means for mounting the lower ends of said inclined frame members to the wall of said vehicle at a location above the floor, said frame being characterized in the absence of connection between said seat or said frame and the floor of said vehicle.

14. In a multi-passenger seat for a transit vehicle, the combination comprising: horizontal seat frame means including forward and rear horizontally elongated stretcher tubes extending respectively at the forward and rear locations of said seat; cross frame tube means interconnecting the outboard ends of said horizontal stretcher tubes to form a rigid structure; inclined truss frame means located beneath said horizontal stretcher tubes and including forward and rear inclined frame tube members attached at their upper ends to said forward and rear stretcher tubes respectively at a location outward of the transverse midsection of said seat and extending downwardly therebeneath; and means for mounting the wall ends of said horizontal stretcher tubes and the lower ends of said inclined tube members to the wall of said vehicle at a location above the floor, said seat frame being characterized in the absence of further connection between said frame and said vehicle.

* * * * *

PO-1050
(5/69)

UNITED STATES PATENT OFFICE
CERTIFICATE OF CORRECTION

Patent No. 3,747,979            Dated July 24, 1973

Inventor(s) Chester J. Barecki

It is certified that error appears in the above-identified patent and that said Letters Patent are hereby corrected as shown below:

Claim 1.
Column 6, line 33; "tubes" should read --- members ---
         line 34; "tubes" should read --- members ---
         line 36; "tubes" should read --- members ---
         line 37; after "inclined" insert --- truss ---
         line 38; after "members" omit --- rigidly ---
         line 39; "tubes" should read --- members ---
         line 42; "tubes" should read --- members ---
         line 43: omit "tube" and insert --- truss frame ---
Claim 2.
Column 6, line 50; "tubes" should read --- members ---
         line 51; "tubes" should read --- members ---
Claim 3.
Column 6, line 54; "tubes" should read --- members ---
         line 56; "tube" should read --- member ---
Claim 5.
Column 6, line 65; after "second" delete --- tubular ---
         line 66; "tubes" should read --- members ---
Claim 6.
Column 7, line 2; after "second" delete --- tubular ---
         line 3; "tubes" should read --- members ---
         line 4; after "frame" delete --- tube ---
         line 5; after "upper" delete --- tubular ---
         line 7; "tubes" should read --- members ---
                after "frame" delete --- tubular ---
Claim 8.
Column 7, line 15; "tubes" should read --- members ---
Claim 9. line 17; "tubes" should read --- members ---
Column 7, line 22; "tube" should read --- member ---
         line 24; before "portions" delete --- tubular ---
         line 25; "tubes" should read --- members ---
Claim 10.
Column 7, line 28; after "individual" delete --- tubular ---
         line 32; "tubes" should read --- members ---

UNITED STATES PATENT OFFICE
CERTIFICATE OF CORRECTION

Patent No. 3,747,979　　　　　Dated July 24, 1973

Inventor(s) Chester J. Barecki

Page 2

It is certified that error appears in the above-identified patent and that said Letters Patent are hereby corrected as shown below:

```
Claim 12.
Column 7, line 41;  "tubes" should read --- members ---
                    after "frame" delete --- tubular ---
          line 42;  "tubes" should read --- members ---
          line 44;  after "second" delete --- tubular ---
          line 46;  "tubes" should read --- members ---
Column 8, line 3;   "tubes" should read --- members ---
                    after "and" insert --- an ---
          line 8;   "tubes" should read --- members ---
Claim 14.
Column 8, line 31;  "tubes" should read --- members ---
          line 32;  after "frame" delete --- tube ---
          line 34;  "tubes" should read --- members ---
          line 36;  "tubes" should read --- members ---
          line 37;  before "members" delete --- tube ---
          line 38;  "tubes" should read --- members ---
          line 42;  "tubes" should read --- members ---
                    after "inclined" delete --- tube ---.
```

Signed and sealed this 19th day of February 1974.

(SEAL)
Attest:

EDWARD M. FLETCHER, JR.　　　　　C. MARSHALL DANN
Attesting Officer　　　　　　　　Commissioner of Patents